Patented May 25, 1954

2,679,525

UNITED STATES PATENT OFFICE 2,679,525

OXYPROPYLATED ESTERS OF SULFO-POLYCARBOXYLIC ACIDS

Melvin De Groote, University City, Mo., assignor to Petrolite Corporation, a corporation of Delaware No Drawing. Application January 29, 1951, Serial No. 208,441

7 Claims. (Cl. 260—481)

The present invention is concerned with certain new products, compounds or compositions of matter which are essentially mixed ester salts of a monobasic acid and a polybasic acid. Two moles of the former and, more specifically, monocarboxy acids are employed whereas one mole of the latter is employed. The latter is a type in which two carboxyl radicals appear in ester form and one sulfo radical appears in salt form.

The present invention is a continuation-in-part of my co-pending application, Serial No. 186,682, filed September 25, 1950, now Patent 2,602,055.

Compounds of the kind previously described are derived preferably by reaction between four types of reagents: (a) polypropylene glycol of a molecular weight sufficient to give water-insolubility and kerosene-solubility, generally being in the molecular weight range of 750 to approximately 3,000; (b) a dicarboxy compound selected from the class consisting of maleic acid (or anhydride), citraconic acid (or anhydride), and fumaric acid; (c) a low molal monocarboxy acid having less than 8 carbon atoms and preferably 3 or less; and (d) an alkali metal bisulfite such as sodium bisulfite or potassium bisulfite.

The preparation of the compounds or products previously described involves substantially three steps: (a) The esterification of the propylene glycol mole for mole with the low molal monocarboxy acid, such as acetic acid, propionic acid, lactic acid, etc., to produce a fractional ester having one free hydroxyl radical; (b) esterification between the moles of the fractional ester obtained from polypropylene glycol and acetic acid, for example, one mole of a dicarboxy compound such as maleic anhydride; and (c) reaction between such complete ester and a suitable alkali metal bisulfite such as sodium bisulfite.

Alternately one can esterify the glycol first with the dicarboxy acid or anhydride and then esterify with a monocarboxy acid, such as acetic acid. There is no choice between the two procedures.

More specifically then the present invention is concerned with certain hydophile products of the kind described; said hydrophile synthetic products being characterized by the following formula:

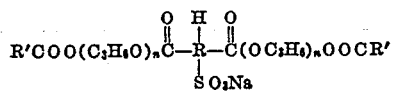

in which

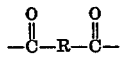

is the divalent radical of an unsaturated dicarboxy acid selected from the class consisting of maleic acid, fumaric acid, and citraconic acid; $n$ is a whole number varying from 12 to 80; and R'CO is the acyl radical of a low molal monocarboxy acid having less than 8 carbon atoms, and with the proviso that the polypropylene glycol prior to esterification be water-insoluble and kerosene-soluble.

In the above formula the alkali metal cation is shown as sodium which is the cheapest and most readily available. Needless to say, any other alkali metal cation, such as potassium, may be employed in the form of potassium bisulfite and is included in the hereto attached claims as the obvious chemical equivalent. Similarly ammonium bisulfite may be employed instead of sodium or potassium bisulfite. This applies also to the bisulfite of various organic bases provided, of course, that such bases prior to forming a sulfite are as basic as ammonia and that the sulfite is water-soluble. All these are the obvious functional equivalent of sodium bisulfite. The procedure is illustrated in the following example.

Example 1

In a reaction flask there were placed 9 grams of glacial acetic acid, and 305 grams of propylene glycol 2025 (molal ratio of glycol to acid 1:1) along with one-half of 1% of toluene sulfonic acid. In this instance 1.5 grams were used. There was also added 50 cc. of xylene. Heat was applied and the mixture allowed to reflux for about 3½ hours. The maximum temperature during the reflux period was approximately 145° C. At the end of this time approximately 2½ cc. of water had been carried over to the phase-separating trap. At the end of this period there was still a slight acidity due to the catalyst and also perhaps a small amount of uncombined acetic acid. An additional ½% of toluene sulfonic acid was added along with 8 grams of maleic anhydride. Heat was applied again and the mixture refluxed for 4 hours. The maximum temperature during the second reflux period, as in the first case, was 145° C. The amount of water which distilled over in this instance was just a little bit more than one cc. At the end of the reaction period there was still a slight acidity due to the presence of the acid catalyst, possibly some uncombined maleic acid, or anhydride, and possibly some uncombined acetic acid. A small amount of 30% aqueous caustic soda was added until sufficient had been introduced to neutralize the free sulfonic acid radical and the free carboxyl acid radicals.

After this adjustment, 8 grams of powdered sodium bisulfite were added. Apparently enough water had been added along with the caustic soda to dissolve at least part of the sodium bisulfite so that further addition of water was not required. Needless to say, if no caustic soda solution was used to neutralize the acidity, then a little water should be added to dissolve at least part or all of the sodium bisulfite so as to give a saturated solution. The reaction mixture was stirred and heated for three hours. No effort was made to have any reflux take place during this stage of the reaction for the obvious reason that if water were removed and the sodium bisulfite were anhydrous there would be little or no opportunity for reaction. This was necessary also for the reason that sodium bisulfite begins to decompose at about 100° C. and this reaction obviously must be conducted at a suitable temperature until the sodium bisulfite has combined. Thereafter the xylene can be distilled over in the usual manner, removing any water with it and all the xylene can be removed by distillation, particularly vacuum distillation. The same procedure was followed in connection with a number of additional samples, all of which are illustrated in the following tables which gives the reactants, amounts employed, temperature of esterification, etc.

weight based theoretically on the value one would expect to obtain by treating water or propylene glycol, for example, with propylene oxide. Needless to say, one does not obtain a single compound but a propylene glycol of a molecular weight ratio of 750 or 1,000 or 2,000 as the case may be and really represents a cogeneric mixture whose statistical average molecular weight is the one indicated. Reference in the table is, of course, to hydroxyl value molecular weight for the obvious reason that this is the basis for calculating the amount of reactants required.

In all instances a small amount of 30% caustic soda was used as in the more complete description of Example 1. Also a small amount of toluene sulfonic acid, approximately 1% of the weight of the glycol or slightly less, was used in the two esterification steps. About one-half of this amount was used in the first esterification step (with the monocarboxy acid), and an equal amount added during the second esterification step (with the dicarboxy reactant). A larger

TABLE 1

| Ex. No. | M. W. of Polypropylene Glycol | Amt. Used (grs.) | Monocarboxy Acid | Amt. Used (grs.) | Xylene (ccm.) | Max. Esterification Temp. (° C.) | Esterification Time (hrs.) |
|---|---|---|---|---|---|---|---|
| 1 | 2,025 | 300 | Acetic | 9 | 50 | 145 | 3½ |
| 2 | 725 | 115 | ----do---- | 9 | 45 | 143 | 3¼ |
| 3 | 1,025 | 155 | ----do---- | 9 | 45 | 139 | 4 |
| 4 | 2,525 | 375 | ----do---- | 9 | 60 | 140 | 4¼ |
| 5 | 1,525 | 230 | ----do---- | 9 | 45 | 145 | 4¼ |
| 6 | 2,025 | 300 | ----do---- | 9 | 50 | 143 | 4 |
| 7 | 725 | 115 | ----do---- | 9 | 50 | 145 | 4½ |
| 8 | 1,025 | 155 | ----do---- | 9 | 45 | 143 | 3½ |
| 9 | 2,525 | 375 | ----do---- | 9 | 45 | 143 | 3¼ |
| 10 | 1,525 | 230 | Propionic | 11.5 | 60 | 140 | 3¾ |
| 11 | 2,025 | 300 | ----do---- | 11.5 | 55 | 141 | 4 |
| 12 | 725 | 115 | ----do---- | 11.5 | 50 | 140 | 4¼ |
| 13 | 1,025 | 155 | ----do---- | 11.5 | 50 | 145 | 4½ |
| 14 | 2,525 | 375 | ----do---- | 11.5 | 45 | 141 | 4 |
| 15 | 1,525 | 230 | ----do---- | 11.5 | 60 | 141 | 3½ |
| 16 | 2,025 | 300 | ----do---- | 11.5 | 50 | 140 | 3¼ |
| 17 | 725 | 115 | ----do---- | 11.5 | 55 | 141 | 4¾ |
| 18 | 1,025 | 155 | ----do---- | 11.5 | 45 | 139 | 4½ |
| 19 | 2,525 | 375 | ----do---- | 11.5 | 60 | 142 | 3 |
| 20 | 1,525 | 230 | ----do---- | 11.5 | 55 | 141 | 4½ |

TABLE 2

| Ex. No. | Dicarboxy Reactant | Amt. Used (grs.) | Max. Esterification Temp. (° C.) | Esterification Time (hrs.) | Sodium Bisulfite (grs.) | Max. Reaction Temp. (° C.) | Reaction Time (hrs.) |
|---|---|---|---|---|---|---|---|
| 1 | Maleic Anhydride | 8 | 145 | 4 | 8 | 80–95 | 3 |
| 2 | ----do---- | 8 | 140 | 3½ | 8 | 80–95 | 3¼ |
| 3 | ----do---- | 8 | 144 | 3 | 8 | 80–95 | 4½ |
| 4 | ----do---- | 8 | 143 | 3½ | 8 | 80–95 | 4 |
| 5 | ----do---- | 8 | 140 | 4¼ | 8 | 80–95 | 4 |
| 6 | Citraconic Anhyd | 9 | 149 | 3 | 8 | 80–95 | 3¾ |
| 7 | ----do---- | 9 | 141 | 4 | 8 | 80–95 | 3¾ |
| 8 | ----do---- | 9 | 141 | 4 | 8 | 80–95 | 4¼ |
| 9 | ----do---- | 9 | 139 | 4¼ | 8 | 80–95 | 3½ |
| 10 | ----do---- | 9 | 140 | 3½ | 8 | 80–95 | 4 |
| 11 | Maleic Anhydride | 8 | 144 | 3¾ | 8 | 80–95 | 4½ |
| 12 | ----do---- | 8 | 143 | 3½ | 8 | 80–95 | 3¾ |
| 13 | ----do---- | 8 | 140 | 3½ | 8 | 80–95 | 4 |
| 14 | ----do---- | 8 | 141 | 4 | 8 | 80–95 | 3¾ |
| 15 | ----do---- | 8 | 144 | 4½ | 8 | 80–95 | 3½ |
| 16 | Citraconic Anhyd | 9 | 139 | 4½ | 8 | 80–95 | 4½ |
| 17 | ----do---- | 9 | 143 | 3½ | 8 | 80–95 | 3¼ |
| 18 | ----do---- | 9 | 140 | 4¼ | 8 | 80–95 | 4 |
| 19 | ----do---- | 9 | 142 | 4 | 8 | 80–95 | 3½ |
| 20 | ----do---- | 9 | 144 | 4½ | 8 | 80–95 | 3¼ |

Polypropylene glycols are commercially available. Such polypropylene glycols are furnished in various molecular weight ranges. The water-insoluble, kerosene-soluble polypropylene glycols begin in the molecular weight range somewhere above 500, and more specifically, at about 700 or 750. The molecular weight was usually determined by the hydroxyl method. Such hydroxyl molecular weight is a fraction, sometimes a large major fraction, of the theoretical molecular amount should not be used at any time because there may be decomposition of the glycol. The total amount can be added during the initial esterification if desired. Smaller amounts can be used, for instance, a total of ½ of 1% or ¾ of 1% based on the amount of glycol, provided, however, that the esterification time is extended somewhat.

One may use any one of a variety of monocarboxy acids, such as those previously noted.

or higher acids of the aliphatic series, such as butyric or valeric. The acids may be cyclic as in the case of benzoic, cyclohexanoic and furoic. The acid may have the carbon chain interrupted by an oxygen atom as in the instance of beta-methoxy propionic acid. The acids may be hydroxylated as in the case of hydroxyacetic acid or lactic acid. In any event, however, the acids must be free from any radical having 8 or more uninterrupted carbon atoms in a single group.

One need not prepare the ester in the manner described above but may use some other conventional procedure as, for example, the use of the acyl chloride instead of the acid, or by alcoholysis involving methyl or ethyl acetate, ethyl or methyl propionate, etc. One may also start with the acid itself, such as acetic acid or propionic acid and subject such acid to oxypropylation until the desired molecular weight is reached.

The products obtained are comparable to the initial glycol in appearance, etc., i. e., usually they are an amber color or at least of a slight straw color, and often somewhat thicker than the original glycol. This description, of course, applies to materials after the removal of the solvent, i. e., the xylene. For use as demulsifiers there is no need to remove the xylene and it may remain behind. Obviously other liquids than xylene may be used in esterification procedure. However, if the boiling point is any higher than xylene there is danger that decomposition may take place unless the amount of sulfonic acid is reduced. Other catalysts such as a small amount of dry hydrochloric acid can be used but it appears less desirable than the sulfonic acid. Needless to say, the caustic soda solution used neutralizes the sulfonic acid catalyst present.

The equipment used in esterification procedure is a resin pot of the kind described in U. S. Patent No. 2,499,370, dated March 7, 1950, to De Groote and Keiser. Any conventional equipment can be used, either on a small scale, pilot plant scale, or larger scale.

In the various examples preceding only one glycol has been used in these cases. Actually there is no reason why one may not use two different glycols, for instance, an equimolar mixture of two glycols, one for example having a molecular weight of 2000 and the other 3000, or one having a molecular weight of 1500 and the other 2500. Actually these glycols are cogeneric mixtures, at each selected molecular weight. If one does make a mixture of the kind here described actually three types of compounds will appear; one type in which both polycarboxy acid radicals are joined with the higher glycol, one type where both carboxyls are joined with the lower molecular weight glycol, and one type where one carboxyl is united to a higher molecular weight glycol, and the other one to a lower molecular weight glycol.

Other variations are obviously possible by using different monocarboxy acids. For example, the same dicarboxy reactant can be used such as maleic anhydride united with different esters of the same glycol, for instance, acetic acid ester and propionic acid ester, or the different acids might be joined to glycols of different molecular weights.

The products so obtained are peculiar (a) insofar that there is not present any radical having 8 or more uninterrupted carbon atoms, and (b) the compounds are not particularly effective as surface-active agents in the ordinary sense due either to the large molecular size or the absence of a hydrophobe radical of the kind previously referred to, or for some other reason which is obscure. The chemical compounds herein employed as demulsifiers have molecular weights varying from more than 1000 up to several thousands, for instance, 5000, 6000, or 7000, and yet contain only one sulfo radical. Utility of such compounds for industrial uses is rather unusual. They are not effective emulsifying agents, but are valuable as an additive or a promoter of emulsions. These compounds also have hydrotropic property and serve as common solvents in the preparation of micellar solutions. It is to be noted that they are free from terminal carboxyl radicals and thus differ from reagents obtained, for example, by treating one mole of a high molal polypropylene glycol with 2 moles of a dicarboxy acid.

As pointed out in the aforementioned co-pending application, Serial No. 186,682, filed September 25, 1950, now Patent 2,602,055, products of the kind above described are suitable for demulsification of petroleum emulsions of the water-in-oil type. Said aforementioned co-pending application is directly concerned with this phase of the invention. However, the utility of these compounds is not limited to this particular field of application but I have found they are useful for other purposes, such as the following, and particularly as additives in the preparation of emulsions. Extremely dilute emulsions, for instance, those in which the dispersed phase is less than two-tenths of a per cent, and usually less than one-tenth of a per cent, have been prepared without using an emulsifying agent. The majority of emulsions, however, are prepared by the use of an emulsifying agent, and thus the emulsion system consists essentially of three ingredients. However, many technical emulsions actually have a fourth ingredient which may be an emulsifier of indifferent or inferior effect, but is valuable because it is a coupling agent or mutual solvent. See "The Composition and Structure of Technical Emulsions," J. H. Goodey, Royal Australian Chem. Inst. J. and Proc., 16, 1949, pp. 47–75.

Other uses involve these compounds as break-inducers in the doctor treatment of sour hydrocarbons, as additives to lubricating oils of both the naturally-occurring petroleum type of lubricant and also synthetic lubricants which in many instances are largely polymerized alkylene oxides as described in U. S. Patent No. 2,448,664, dated September 7, 1948, to Fife et al.

Having thus described my invention what I claim as new and desire to secure by Letters Patent, is:

1. Hydrophile synthetic products; said hydrophile synthetic products being characterized by the following formula:

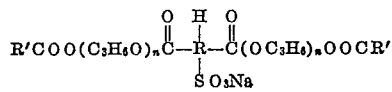

in which

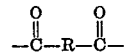

is the divalent radical of an unsaturated dicarboxy acid selected from the class consisting of maleic acid, fumaric acid, and citraconic acid and has a structure selected from the class consisting of

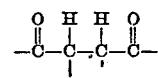

and

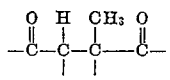

structures; $n$ is a whole number varying from 12 to 80; and R'CO is the acyl radical of a low molal monocarboxy acid having less than 8 carbon atoms, and with the proviso that the polypropylene glycol prior to esterification be water-insoluble and kerosene-soluble.

2. The product of claim 1 wherein the dicarboxy acid is maleic acid.

3. The product of claim 1 wherein the dicarboxy acid is maleic acid and the value of $n$ corresponds to a polypropylene glycol of approximately 700 molecular weight.

4. The product of claim 1 wherein the dicarboxy acid is maleic acid and the value of $n$ corresponds to a polypropylene glycol of approximately 1000 molecular weight.

5. The product of claim 1 wherein the dicarboxy acid is maleic acid and the value of $n$ corresponds to a polypropylene glycol of approximately 1500 molecular weight.

6. The product of claim 1 wherein the dicarboxy acid is maleic acid and the value of $n$ corresponds to a polypropylene glycol of approximately 2000 molecular weight.

7. The product of claim 1 wherein the dicarboxy acid is maleic acid and the value of $n$ corresponds to a polypropylene glycol of approximately 2500 molecular weight.

References Cited in the file of this patent

UNITED STATES PATENTS

| Number | Name | Date |
|---|---|---|
| 2,072,085 | De Groote et al. | Mar. 2, 1937 |
| 2,184,794 | De Groote | Dec. 26, 1939 |
| 2,301,609 | Bonnet | Nov. 10, 1942 |
| 2,305,067 | De Groote | Dec. 15, 1942 |